Sept. 11, 1962 G. J. FOSS ETAL 3,053,387
OVERFILLED CONTAINER DETECTOR AND REJECT APPARATUS
Filed Nov. 17, 1959 2 Sheets-Sheet 1
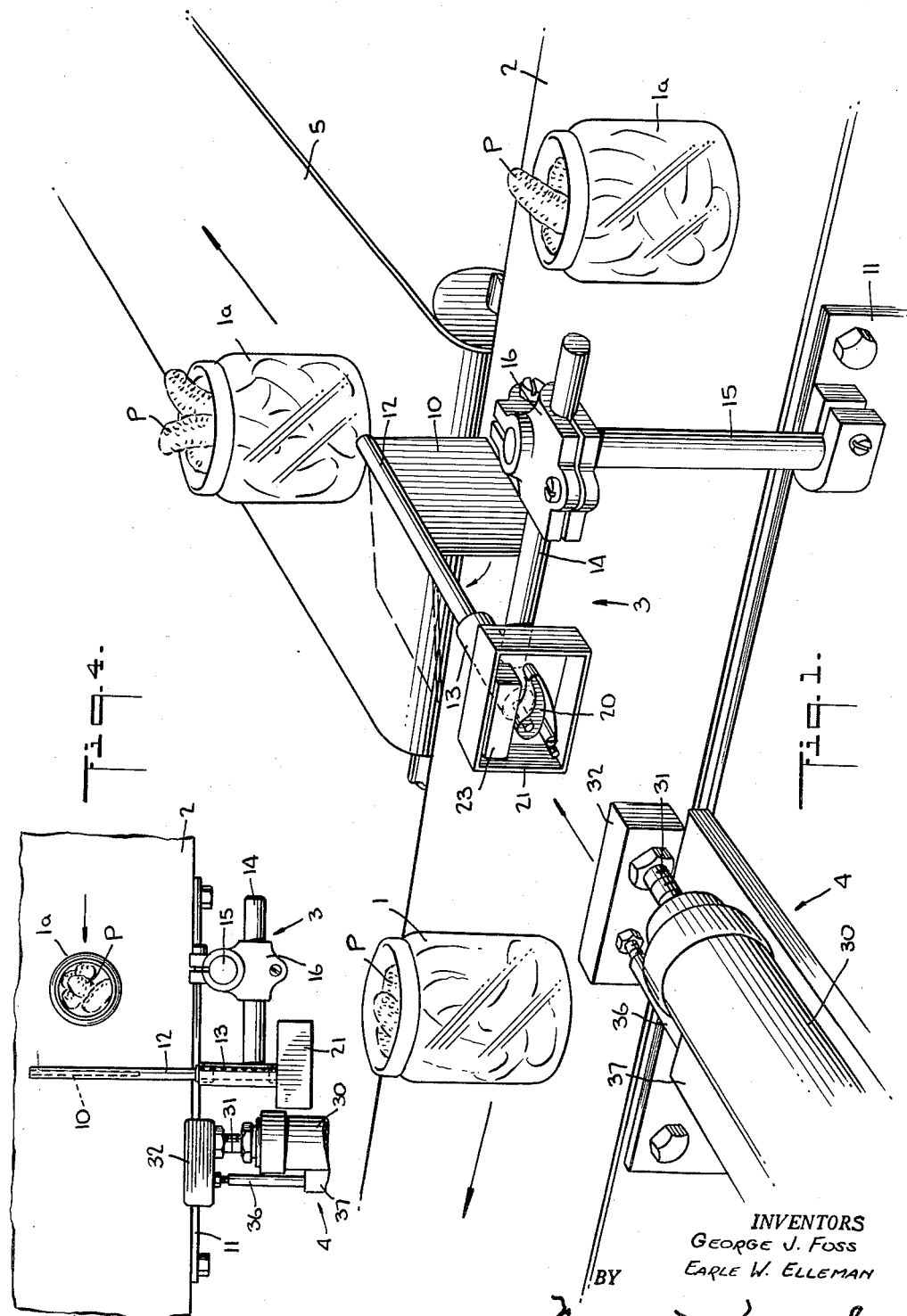
INVENTORS
GEORGE J. FOSS
EARLE W. ELLEMAN
BY
ATTORNEY Sept. 11, 1962 G. J. FOSS ETAL 3,053,387
OVERFILLED CONTAINER DETECTOR AND REJECT APPARATUS
Filed Nov. 17, 1959 2 Sheets-Sheet 2
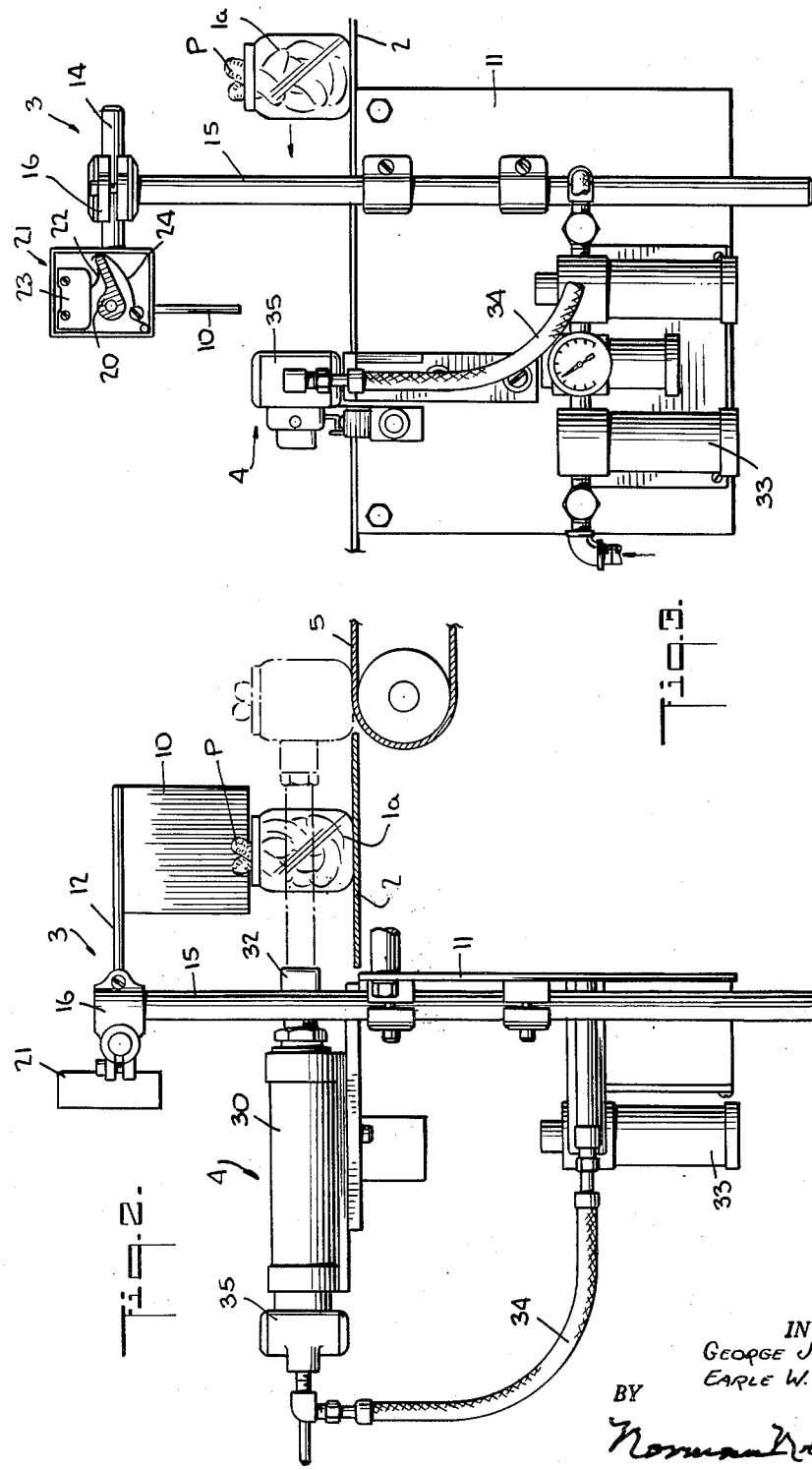
INVENTORS
GEORGE J. FOSS
EARLE W. ELLEMAN
BY
Norman R. Holland
ATTORNEY

… …

3,053,387
OVERFILLED CONTAINER DETECTOR AND REJECT APPARATUS
George J. Foss, Lancaster, and Earle W. Elleman, Columbus, Ohio, assignors to Anchor Hocking Glass Corporation, Lancaster, Ohio, a corporation of Delaware
Filed Nov. 17, 1959, Ser. No. 853,556
1 Claim. (Cl. 209—90)

The present invention relates to detecting mechanism and more particularly to a mechanism for detecting and rejecting overfilled containers.

In the packaging industry, most of the operations involved in filling containers and in sealing them are performed by automatic machinery.

Glass containers are filled by moving the empty containers past a filling station which fills each container with a pre-measured amount of product. The containers are then moved to a sealing station which seals them by applying a suitable closure cap thereon.

While the amount of the product to be introduced into each container is usually automatically pre-measured, this measure is adequate only where a relatively flowable product is being packaged, such as a powdered substance (powdered coffee) or a liquid (wine).

However, when non-flowable products of considerable size are to be packaged, for example, pickles or tomatoes, it has been found that because of the unusual shape of the particular product, the pre-measured amount sometimes will not fit into a container, thereby causing difficulty in the sealing operation. Thus if a pickle, for instance, protrudes beyond the mouth of a container, a closure cap cannot be applied to the container without crushing and mutiliating the product. If the protruding product is resistant to crushing, such as pigs knuckles, it may jam the sealing operation or it may produce an inadequate seal on the container.

In the past, an attendant has been stationed at the filling station to remove any containers which have products protruding therefrom. This has been an expensive operation and, since the height of the products must be estimated visually, this procedure does not insure that all containers from which products are protruding will be removed.

The present invention overcomes these defects and provides a detecting mechanism which will automatically detect containers having products protruding therefrom.

Another object of the present invention is to provide a detecting mechanism which will automatically detect overfilled containers and push them out of the production line.

Another object of the present invention is to provide a detecting mechanism which will detect any product protruding out of a container regardless of its height above the container rim.

Another object of the present invention is to provide an improved detecting mechanism which is simple to operate and maintain.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the improved detecting mechanism showing the operation of the various parts;

FIG. 2 is an end view, partly in section, of the detecting mechanism showing an overfilled container being pushed out of line;

FIG. 3 is a side view of the detecting mechanism showing the air supply system; and FIG. 4 is a top plan view showing the path of the container.

Referring more particularly to FIG. 1, a plurality of containers 1 and 1a which have been filled with a suitable product P, such as pickles, by a filling mechanism (not shown) are moved by a suitable conveyor 2 past a detecting mechanism, generally designated as 3. A container, such as the container 1, which does not have any products P protruding therefrom will not be affected by the detecting mechanism and will be moved by the conveyor 2 to a suitable sealing mechanism (not shown).

However, when a container having a product P protruding from it (such as container 1a in FIG. 1), is moved past the detecting mechanism 3, the protruding product will be sensed by the detecting mechanism to actuate a suitable reject mechanism, generally designated as 4, which will move the rejected container 1a off the conveyor 2 and onto a suitable take-off mechanism, such as the take-off conveyor 5 shown in FIG. 1.

The detecting mechanism preferably used with the present invention comprises a detecting flag 10 pivotally mounted on the frame 11 by the intermediation of shaft 12 journalled in sleeve 13, horizontal support rod 14 and upstanding standard 15 attached to the frame 11. The horizontal support rod 14 is adjustably mounted in a vertically adjustable sleeve 16 on the upstanding standard 15 so that the detecting flag 10 may be vertically adjusted to permit detection of containers of varying heights.

The detecting flag 10 is operatively connected by shaft 12 to control lever 20 located in a switch box 21 mounted on the horizontal support rod 14. A spring 24 (FIG. 3) holds the control lever 20 in abutment with a contact element 22 of a microswitch 23 so as to maintain the circuit open. When a container 1a having a product P protruding from its open end is moved past the detector flag 10, the detector flag 10 will be struck by the protruding product and will swing to the dotted line position shown in FIG. 1 and will turn the control lever 20 in a clock-wise direction against the action of spring 24 to release the contact element 22 and permit it to close an electric circuit thus actuating the reject mechanism 4 to push the container 1a onto the take-off conveyor 5.

The height of the detecting flag 10 is adjusted by vertically adjustable sleeve 16 so that it will be in close relationship to a container passing therebeneath to permit detection of all protruding products even if they protrude for only a short distance above the rim. The detecting flag 10 is also of sufficient width to span the entire width of the container rim so that protruding products will be detected by flag 10 regardless of whether they protrude from one side of the container rim or the other.

The preferred reject mechanism 4 used with the present invention comprises an air cylinder 30 which has the usual piston therein (not shown) on which is mounted the piston rod 31 supporting a pusher pad 32. Air under pressure is supplied to air cylinder 30 from the air units 33 through conduit 34 (FIGS. 2 and 3) and passage of air into the cylinder 30 is controlled by an electric air valve 35 which is in circuit with the micro-switch 23 in switch box 21. Thus, when the contact 22 is released by control lever 20 to close the circuit, the electric air valve 35 is energized to admit air to air cylinder 30 which will move the pusher pad 32 outwardly (dotted line position of FIG. 2) to push the container 1a onto the take-off conveyor 5.

Suitable means (not shown) may then be used to withdraw the pusher pad 32 so that it does not interfere with the continued operation of the machine.

In order to maintain the pusher pad 32 on a horizontal plane and prevent it from rotating on its piston rod 31, it is connected to a guide bar 36 slidable in a guide 37 (FIGS. 1 and 4). While the operation of the present invention is obvious from the above description, it will not be briefly summarized.

When a container 1 which does not have a protruding product passes the detecting unit 3, it will pass beneath flag 10 without disturbing it. However, if a container, such as container 1a, which has a product P protruding from its open end passes beneath the detecting mechanism 3, the protruding product P strikes the flag 10 and swings it on its fulcrum so that its associated control lever 20 in switch box 21 will move downwardly thereby releasing the electric contact 22 to close the switch 23. Switch 23 will close the circuit to the electric air valve 35 to activate it and admit air to the air cylinder 30 to thereby move the pusher pad 32 outwardly and move the container 1b onto the take-off conveyor 5.

Hence, the present invention permits only those containers which do not have protruding products extending from the open end to be moved to the sealing mechanism and hence avoids multilation or jamming of the sealing operation.

After the container 1a has been taken off the conveyor 1, the flag 10 will be returned to its original position by means of the spring 24 acting on the control lever 20 thereby moving contact element 22 of micro-switch 23 upwardly to open the circuit and de-energize the air valve 35. The air supply to the air cylinder is shut-off and the pusher pad 32 may then be returned to its original position by any conventional means.

It will be seen that the present invention provides a detecting mechanism which automatically detects containers having products protruding therefrom and which will automatically push such containers out of line.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

A mechanism for rejecting over-filled containers, a frame, a conveyor having an inner edge and an outer edge for moving containers in a line, a vertical standard mounted on said frame outside the inner edge of the conveyor and in close adjacency thereto, a sleeve mounted for vertical adjustment on said vertical standard, a horizontal support rod having one of its ends mounted in said sleeve and being horizontally adjustable in said sleeve in a line parallel to the direction of movement of said conveyor, a switch box mounted on the other end of said horizontal support rod outside and in close adjacency to the inner edge of said conveyor, an electric switch mounted in said switch box having a first contact element and a second protruding movable contact element, a shaft supporting sleeve extending from said switch box at substantially right angles to said horizontal support rod, a shaft having one end rotatably journalled in said supporting sleeve and extending over said conveyor, a detecting flag fixed mounted on and depending from the other end of said shaft and overlying said conveyor, the lower edge of said detecting flag being spaced above the conveyor a distance slightly greater than the height of containers passing there-beneath so that said flag is normally slightly above the tops of containers passing therebeneath but is in close adjacency thereto to permit the flag to be struck by any products protruding from the containers to pivot the shaft in its supporting sleeve, the width of said flag being sufficient to span the entire rim of a container passing therebeneath, an electric air valve in circuit with said switch, an air cylinder controlled by said electric air valve having a piston rod therein, a pusher pad mounted on the front end of said piston rod, a guide bar extending rearwardly from the pusher and slidable in a fixed guide to prevent the pusher rod from rotating, a control lever within said switch box fixedly mounted on and extending from the end of said shaft opposite the end of the shaft from which the detecting flag depends, a spring in said switch box to bias the control lever into abutment with the second movable contact element of the electric switch to hold the movable contact away from the other contact element and to maintain the circuit to the electric air valve open, said shaft being rotated when a product protruding from a container strikes said detecting flag, said control lever being adapted to swing upon rotation of said shaft to release said movable contact element of the switch and permit the movable contact element to move into contact with the first contact element to close the circuit to the air valve and thereby permit air to be admitted to the air cylinder to thereby move the pusher pad outwardly to push the container out of line.

References Cited in the file of this patent
UNITED STATES PATENTS

| | | |
|---|---|---|
| 2,038,652 | Froehlich | Apr. 28, 1936 |
| 2,529,081 | Hughes | Nov. 7, 1950 |
| 2,689,647 | Hofstetter | Sept. 21, 1954 |